United States Patent [19]

Preston

[11] Patent Number: 4,538,589
[45] Date of Patent: Sep. 3, 1985

[54] TOTALLY ADJUSTABLE CAMPFIRE COOKING GRILL

[76] Inventor: Dennis W. Preston, 10509 Xavis St., N.W., Coon Rapids, Minn. 55433

[21] Appl. No.: 632,055

[22] Filed: Jul. 18, 1984

[51] Int. Cl.³ .............................................. A47J 37/07
[52] U.S. Cl. ..................................... 126/30; 126/25 A
[58] Field of Search ............ 126/9 R, 9 A, 9 B, 25 R, 126/25 A, 29, 30; 99/449, 450

[56] References Cited

U.S. PATENT DOCUMENTS

| 1,423,612 | 7/1922 | Jewett | 126/30 |
| 1,452,640 | 4/1923 | Hulick | 126/30 |
| 2,604,884 | 7/1952 | Walker | 126/30 |
| 2,977,953 | 4/1961 | Dowdy | 126/30 |
| 3,095,869 | 7/1963 | Swenson | 126/29 |
| 3,483,816 | 12/1969 | Lombardi | 126/30 |

Primary Examiner—James C. Yeung

[57] ABSTRACT

This cooking grill assembly enables full rotation of a grill portion, which is mounted to a sleeve, and the sleeve is also elevatable for bringing food close to the fire, or raising it so as only to keep it warm. The sleeve is also removable for safely taking the grill portion and cooked food away from the fire.

1 Claim, 5 Drawing Figures

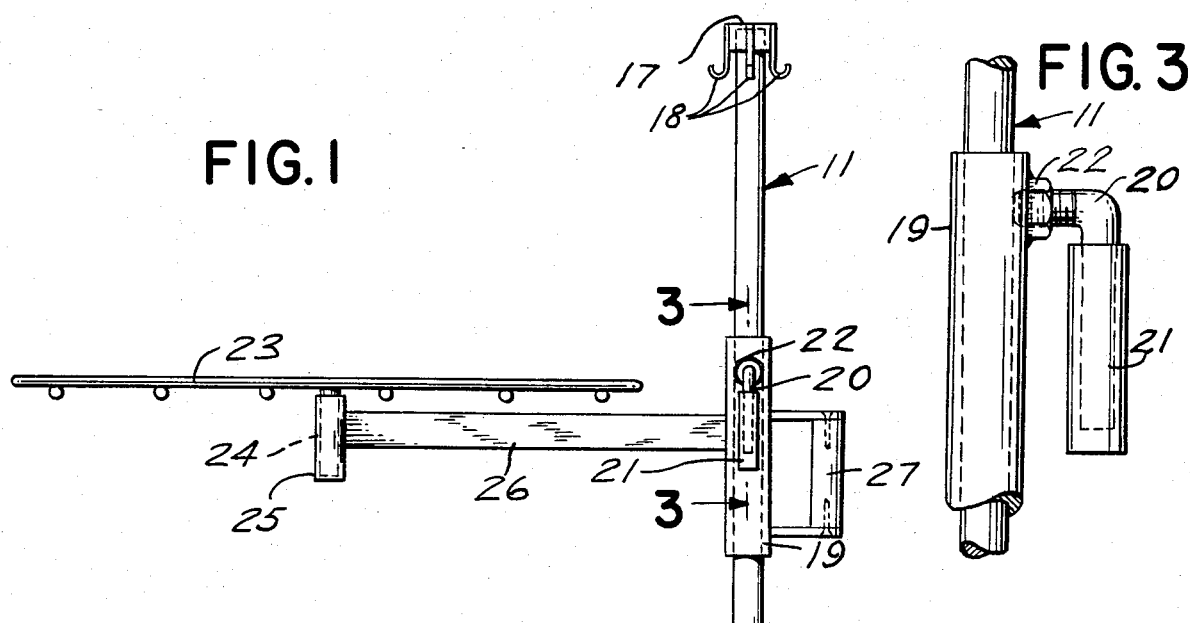
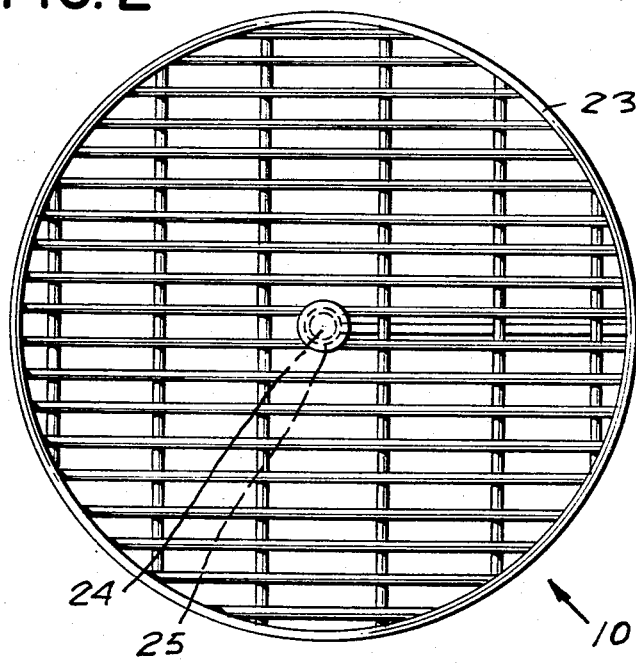
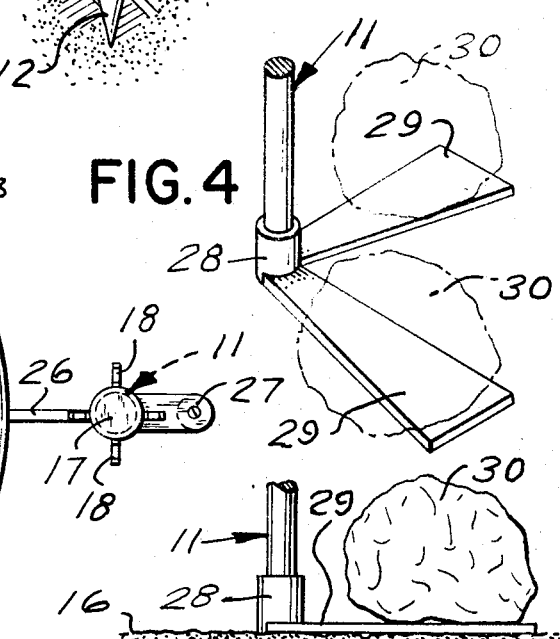

TOTALLY ADJUSTABLE CAMPFIRE COOKING GRILL

This invention relates to cooking grills, and more particularly, to a totally adjustable campfire cooking grill.

The principal object of this invention is to provide a totally adjustable campfire cooking grill, which will be so designed, as to be rotatable a full three hundred and sixty degrees, so as to move items away from hot spots, when desired.

Another object of this invention is to provide a totally adjustable campfire cooking grill, which will be so designed, as to enable its user to remove the grill from the fire, for safely removing the cooked food therefrom.

A further object of this invention is to provide a totally adjustable campfire cooking grill, which will be so designed as to be easily elevatable, enabling food to be grilled as close as three and one-quarter inches from the fire, or raised as high as thirty-four and one quarter inches above the fire, so as to keep food warm only, and the structure is such, that it can be set up in a matter of minutes, and may be employed anywhere desired.

Other objects are to provide a totally adjustable campfire cooking grill, which is simple in design, inexpensive to manufacture, rugged in construction, easy to use, and efficient in operation.

These, and other objects, will be readily evident, upon a study of the following specification, and the accompanying drawing wherein:

FIG. 1 is a side elevational view of the present invention;

FIG. 2 is a top plan view of FIG. 1;

FIG. 3 is an enlarged cross-sectional view, taken along the line 3—3 of FIG. 1;

FIG. 4 is a fragmentary perspective view of a modified form of base for the invention, showing rocks in phantom lines, and FIG. 5 is a side view of FIG. 4.

Accordingly, a grill assembly 10 is shown to include a mounting post 11 of suitable metal, having a pointed lower end 12. An "L"-shaped metal stabilizer rod 13 includes an eye 14 at one end, which is suitably welded to post 11, and the opposite end of rod 13 includes a point 15. End 12 is entered into ground 16 by hammering on top, and rod 13 is urged into ground 16 by the user's foot. A cap 17 is freely received on the top end of post 11, for easy removal and is provided with a plurality of spaced hooks 18, for depending utensils therefrom, and a metal sleeve 19 is freely and slideably elevatable on post 11, and includes an inverted "L"-shaped set screw or bolt 20, having a suitable handle 21 secured thereto. The threaded end of bolt 20 is threaded into a nut fastener 22, welded to sleeve 19 over an opening therethrough, and bolt 20 enables sleeve 19 to be secured in any desired elevation over a fire beneath grill 23. Grill 23 includes a pin or post 24, fixedly secured to its center, which is received in a sleeve 25, which is fixedly secured to one end of a bar 26, and the opposite end of bar 26 is fixedly secured to the outer periphery of sleeve 19. A handle 27 is secured fixedly to the opposite side of sleeve 19, and enables grill 23 to be elevated, lowered, and rotated in a three hundred sixty degree rotation about the vertical axis of post 11.

In use, post 11 is driven into ground 16, and stabilizer rod 13 is pushed into ground 16 by the user's foot. The cap 17 is removed, and sleeve 19 is received on post 11 and locked at the desired elevation by bolt 20. After building a fire over rod 13 area, the grill 23 is placed in the sleeve 25. The grill 23 is rotated away from, or to, hot spots of the fire, by loosening bolt 20 and rotating sleeve 19 to a desired position, after which, bolt 20 is again tightened. The grill 23, with cooked food on it, is lifted from post 11, by also loosening bolt 20 of sleeve 19, and the handle 27 is employed to lift the sleeve 19 and grill portion upward and away from the fire, for safe removal of the cooked food.

Looking now at FIGS. 4 and 5, rod 13 is removed from post 11, and the design is modified to include a sleeve 28, which is fixedly secured to the bottom of post 11, and a pair of substantially triangualar plates 29 are welded to the bottom of sleeve 28, and serve to hold suitable stones 30, which will stabilize and anchor post 11, to ground 16, which in this instance is hard, and will not readily receive a pointed end.

In use, the function of assembly is the same, except for the post 11 being anchored to ground 16 by stones 30 on plates 29 thereof.

While various changes may be made in the detail construction, it is understood that such changes will be within the spirit and scope of the present invention, as is defined by the appended claims.

What is claimed is:

1. A totally adjustable campfire cooking grill, comprising, in combination, a vertical, metal post, a removable cap freely fitted upon a top end of said post, a plurality of spaced apart, utensil-hanging hooks around a side of said cap, a metal grill unit rotatably and slideably supported along said post, said unit comprising a first sleeve around said post, a horizontal bar welded at one end to said sleeve, a second vertical sleeve welded to an opposite end of said bar, a horizontal grill having a downward pin under a center thereof, rotatably received in said second sleeve, an "L"-shaped bolt having a threaded end screwed in a side of said first sleeve for abutting and locking against said post, and a "U"-shaped handle affixed along a side of said first sleeve; and means for supporting said post upright comprising a collar welded around a lower end of said post and a pair of elongated, triangular plates welded at one end to said collar, said plates extending radially from said collar in a horizontal direction for placement of ballasting rocks thereupon.

* * * * *